United States Patent
Roberts et al.

[11] 3,886,849
[45] June 3, 1975

[54] POWER STEERING SYSTEM

[75] Inventors: Maurice P. Roberts, Otterbein;
Harold K. Clendenen, Lafayette,
both of Ind.

[73] Assignee: TRW Inc., Lafayette, Ind.

[22] Filed: Dec. 3, 1973

[21] Appl. No.: 421,228

[52] U.S. Cl. ............... 92/168; 29/156.4 R; 92/169;
180/79.2 R
[51] Int. Cl. .......................... B62d 5/10; F16j 1/22
[58] Field of Search ......... 180/79.2 R; 92/118, 169,
92/165 R, 168; 29/156.4 R

[56] References Cited
UNITED STATES PATENTS

| | | |
|---|---|---|
| 2,570,383 | 10/1951 | Russell ............................ 92/118 X |
| 2,755,876 | 7/1956 | Muller ............................ 180/79.2 R |
| 3,151,696 | 10/1964 | Deford et al. .................. 180/79.2 R |
| 3,518,920 | 7/1970 | Bimba ............................ 92/165 R |

*Primary Examiner*—David Schonberg
*Assistant Examiner*—John A. Pekar

[57] ABSTRACT

A power steering system includes a cylinder assembly which is operable under the influence of fluid pressure from a supply pump to actuate a vehicle steering linkage. The cylinder assembly includes a cylinder having a piston rod extending from one end and a wall which is swaged at the other end. The swaged end of the cylinder wall is fixedly connected to a socket assembly which in turn is connected to the vehicle frame. The piston rod is connected to another socket assembly which is connected with a steering linkage.

5 Claims, 5 Drawing Figures

POWER STEERING SYSTEM

BACKGROUND OF THE INVENTION

This invention relates generally to a power steering system, and more specifically to a cylinder assembly for use in a power system such as a power steering system.

A known power steering system includes a cylinder assembly which is utilized to actuate a steering linkage. The known cylinder assembly includes a cylinder which defines a chamber in which a piston is movable under the influence of fluid pressure to actuate the steering linkage. The head end of the cylinder is closed and is threadedly connected with a first socket assembly while the piston rod extends from the rod end and is connected with a second socket assembly. Commonly, one of the socket assemblies is connected with the steering linkage while the other is connected with the frame.

In known systems, the interconnection of the head end of the cylinder to the socket assembly has been costly and complicated. Such interconnection has commonly involved the use of a plug or cap sized to fit the end of the cylinder to close the cylinder, and a connection of the plug or cap to both the cylinder and the socket assembly. A simplification of that interconnection has been needed.

SUMMARY OF THE PRESENT INVENTION

The present invention is directed to a simplification of the interconnection between a power steering cylinder assembly and the socket assembly to which it is connected. A cylinder assembly constructed in accordance with the present invention includes a cylinder wall having a swaged end portion which is connected with the vehicle frame by a socket assembly. The swaged end portion of the cylinder wall is sized, by a swaging operation, to receive one element of the socket assembly. Another element of this socket assembly is connected directly to the vehicle frame. By swaging the cylinder wall so that it can be directly connected to the one element of the socket assembly, the necessity of providing a cap or plug sized to fit the end of the cylinder is eliminated along with the need for connections between the cap or plug and the cylinder and socket assembly, respectively. This constitutes a substantial simplification in the construction of the system and the cost of manufacture thereof.

DESCRIPTION OF ONE SPECIFIC PREFERRED EMBODIMENT OF THE INVENTION

Figure 1:
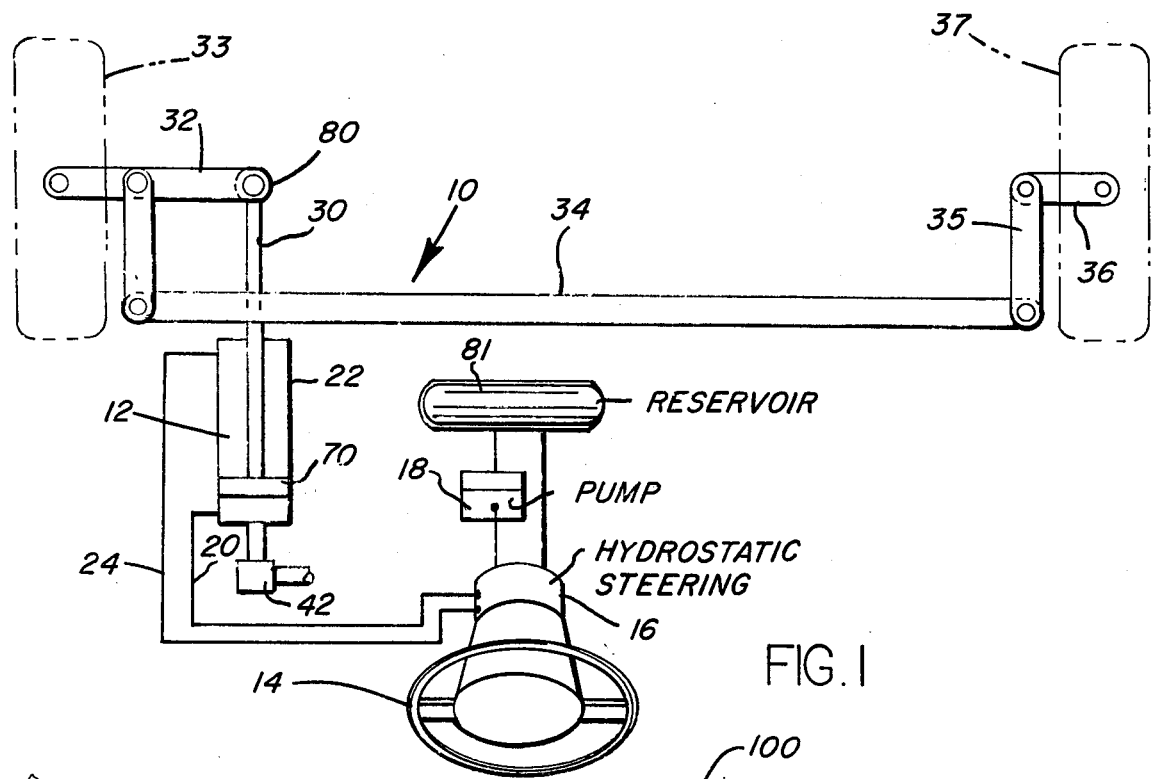
FIG. 1 is a schematic illustration of a power steering system which includes a cylinder assembly constructed in accordance with the present invention.

A known power steering system 10 (FIG. 1) includes a cylinder assembly 12 constructed in accordance with the present invention. Upon rotation of a steering column (not shown) in response to movement of a vehicle steering wheel 14, a hydrostatic steering unit and valve assembly 16 is actuated. Actuation of the valve assembly 16 ports fluid under pressure from a power steering pump 18 to the cylinder assembly 12 through either a conduit 20 connected with a head end of the cylinder assembly 12, or a conduit 24 connected to a rod end of the cylinder assembly 12. The cylinder assembly 12 includes a cylinder 22 and a piston rod 30 and a piston head 70 located within the cylinder 22.

The head end of the cylinder 22 is connected with a socket assembly 42 which in turn is connected to the vehicle frame. The outer end of the piston rod 30 is connected with a link 32. The link 32 is connected to the wheel 33 to effect turning thereof and is also connected through tie rod 34 and links 35, 36 to wheel 37 to effect simultaneous turning thereof. Therefore, operation of the cylinder assembly 12 is effective to actuate the steering linkage and effects turning of the wheels 33, 37.

Since the general construction and mode of operation of the steering system 10 is well known to those skilled in the art, it will not be further described herein to avoid prolixity of description. However, it should be understood that the cylinder assembly 12 could be utilized in association with steering systems other than the specific power steering system 10 illustrated in FIG. 1.

In accordance with the present invention, the cylinder assembly 12 is connected with the socket assembly 42 in a simplified manner. In this connection, the cylinder 22 has a swaged end portion 40 (see FIGS. 2 and 3) which is connected with the socket assembly 42. The circular outer end 50 of the swaged end portion 40 is connected with a cylindrical rod element 48 of the socket assembly 42 by a continuous annular weld 52. The weld 52 extends completely around the cylindrical rod element 48 of the socket assembly 42. The above construction performs the dual functions of fixedly connecting the cylinder 22 to the socket assembly 42 for supporting the cylinder 22 in the vehicle and seals the head end of the cylinder 22 to prevent the leakage of hydraulic fluid from the cylinder during operation of the motor assembly 12. This seal is formed under the combined influence of the weld 52 and a tight abutting engagement between the swaged end portion 40 of the cylinder 22 with a cylindrical surface 53 of the projecting rod 48 of the socket assembly 42.

The socket assembly 42 includes a second socket rod element 56 having a threaded outer end portion 60 which is adapted to be connected with the vehicle frame. The inner end of the socket element 56 (FIG. 2) includes a ball or head portion 64 which is movably received in a circular socket or recess 66 formed in the outer end of the socket assembly 42. The known ball and socket construction of the socket assembly 42 enables the cylinder 22 to pivot or move relative to the vehicle frame during operation of the cylinder assembly 12.

The piston 70 is disposed within a cylindrical chamber 72 defined by the wall of the cylinder 22. The piston 70 is provided with an annular seal 74 which sealingly engages the inner surface of the cylinder 22. The piston 70 is connected with the piston rod 30 which in turn is connected to the link 32 by a socket assembly 80. The socket assembly 80 is of the same construction as the socket assembly 44.

Upon operation of the steering assembly 16 (FIG. 1) to turn the vehicle in one direction, fluid under pressure is ported through the conduit 20 to the head end of the cylinder 22. At the same time, the conduit 24 is connected with a reservoir 81 to exhaust the rod end of the cylinder 22. As the piston 70 moves toward the left (as viewed in FIG. 2), the cylinder assembly 12 is operated from the retracted condition illustrated in FIG. 2 toward an extended condition to effect turning movement of the wheels 33, 37.

When the wheels 33, 37 are to be turned back toward their previous positions, the steering assembly 16 is operated to port fluid under pressure through the conduit 24 to the rod end of the cylinder 22 and to connect the head end of the cylinder 22 with the reservoir 81 through the conduit 20. The relatively high fluid pressure in the rod end of the cylinder 22 causes the piston 70 to move toward the right (as viewed in FIG. 2) to retract the cylinder assembly 12 and effect turning movement of the wheels 33, 37.

Figure 2:
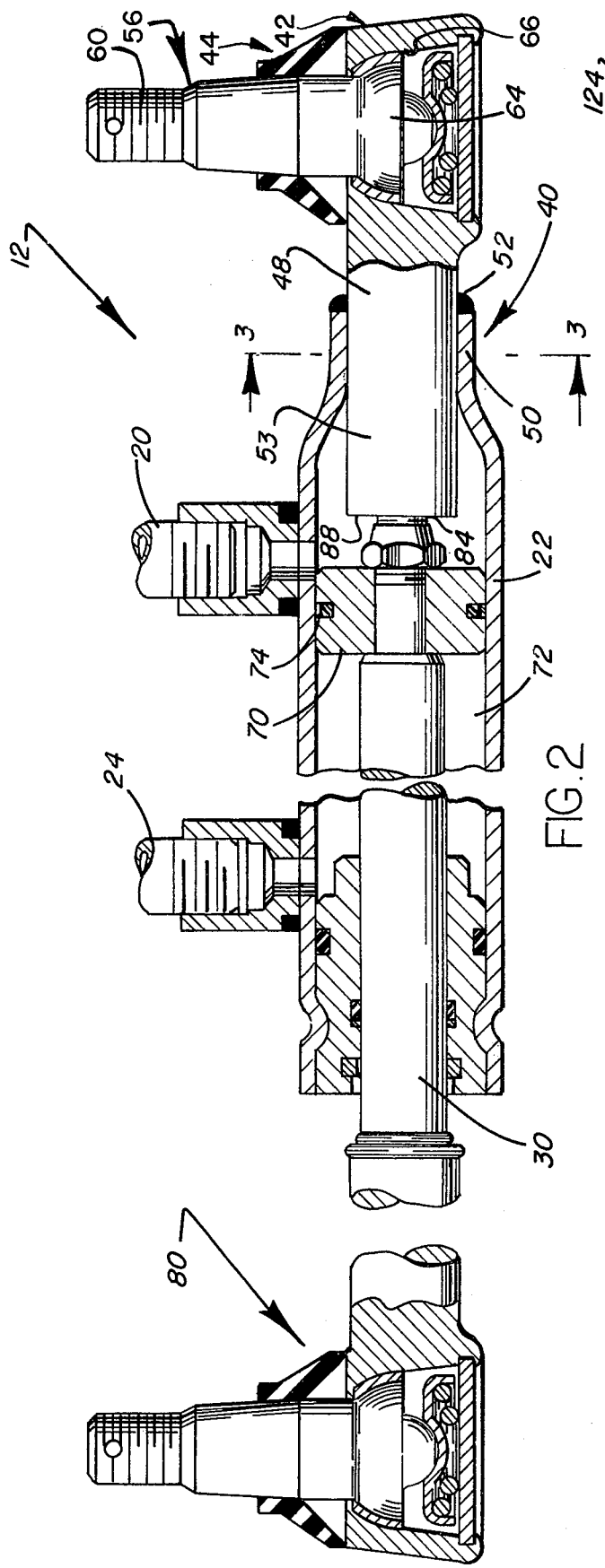
FIG. 2 is an enlarged sectional view of the cylinder assembly used in the system of FIG. 1.
Figure 3:
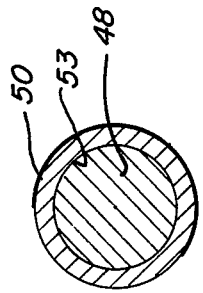
FIG. 3 is a sectional view, taken generally along line 3—3 of FIG. 2, illustrating the engagement of a swaged end portion of a cylinder wall of the cylinder assembly and one element of a socket assembly.

As the piston 70 approaches the fully retracted position of FIG. 2, movement of the piston is limited by engagement with the cylindrical rod element 48 of the socket assembly 42. Thus, as the piston 70 approaches the retracted position, an outer end 84 of the piston rod 30, which forms an extension of the piston 70, moves into abutting engagement with a circular stop surface 88 formed on the inner end of the socket rod element 48. Since the socket assembly 42 is fixedly connected to the cylinder 22 by the weld 52 and frictional engagement between the swaged end 40 and rod element 48, retracting movement of the piston 70 is positively limited by engagement with the socket rod element 48.

Although the swaged end portion 40 of the cylinder 22 has been reduced, by a known swaging operation, to a relatively small diameter in order to tightly grip the rod end portion 48 of the socket assembly 42, it is contemplated that under certain conditions it will be desirable to enlarge the head end of the cylinder 22 by an internal swaging operation, to tightly engage a relatively large diameter end portion of a socket element.

In view of the foregoing description, it can be seen that the power steering system 10 includes cylinder assembly 12 which is supplied with fluid under pressure from a power steering pump 18 upon operation of a hydrostatic steering assembly 16. The cylinder assembly 12 is relatively economical to construct and connect with the socket assembly 42. This is due to the swaged-end construction of the cylinder 22 which is welded to the socket assembly 42. This eliminates the need for a sized plug or cap to close the end of the cylinder 22 and threaded or other type of connection between the socket assembly 42 and the cylinder 22. In addition, the socket assembly 42 cooperates with the piston 70 so as to limit its movement in one steering direction.

Figure 4:
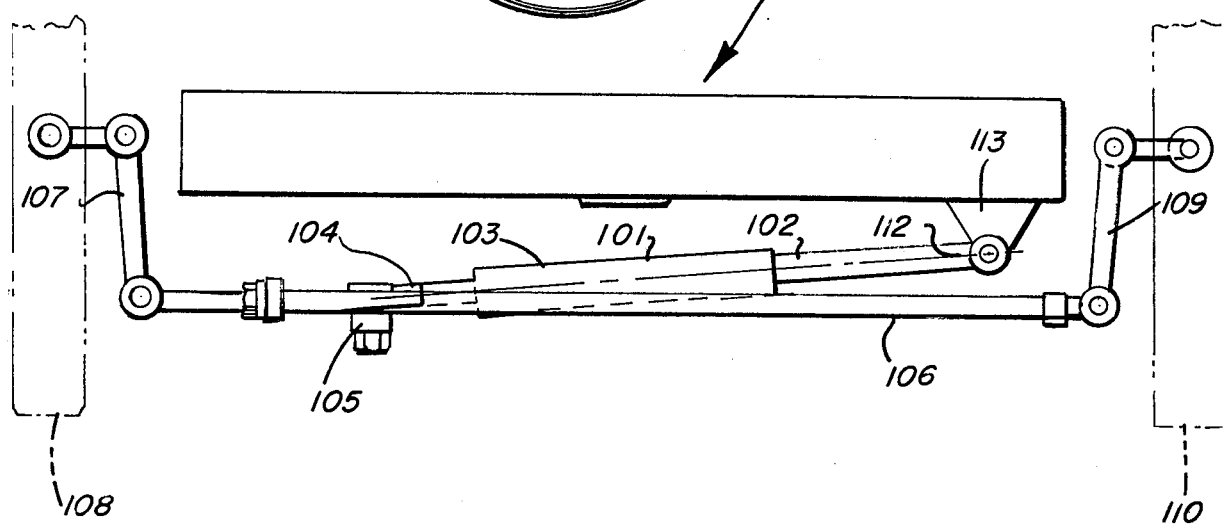
FIG. 4 is a schematic illustration of another power steering system.

The steering system shown in FIG. 4 and which system is generally designated 100 comprises a cylinder assembly 101 which has a head end 102 and a rod end 103. A piston rod 104 extends from the rod end 103 of the cylinder and is suitably connected by a socket assembly 105 to a tie rod 106. The tie rod 106 in turn is connected at one end to a link 107 which is connected with a wheel 108 to effect turning of the wheel when the link 107 turns. The tie rod 106 at the other end is connected with a link 109 which likewise in turn effects turning of the wheel 110 of the vehicle when the tie rod 106 moves.

Figure 5:
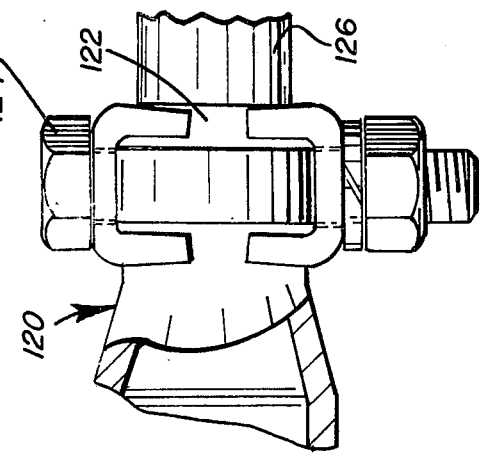
FIG. 5 is a fragmentary view of a part of the system of FIG. 4.

The head end 102 of cylinder assembly 101 is connected by a socket assembly 112 to the frame 113 of the vehicle. The socket assembly 112 and the socket assembly 105 are of similar construction and similar to the constructions of the socket assembly 42 in the embodiment of FIG. 4. These will not be described in detail. However, the cylinder assembly 101 provides a novel and an improved interconnection 120 (FIG. 5) with the socket assembly 112.

The interconnection 120 is such that the extreme outer end portion 122 of the head end 102 of the cylinder assembly 101 is reduced in diametrical dimension so that it has a diameter which is less than the diameter of the remaining portion thereof. This reduced diametrical portion 122 is provided by a swaging operation. The reduced diametrical portion is provided with an axially extending slot therein and a clamp mechanism, which may be a conventional C-shaped type clamp, designated 124, is provided to clampingly and tightly engage the swaged end portion 122 with a rod element 126 of the socket assembly 112.

The connection 120 is relatively inexpensive to fabricate and provides a solid interconnection between the cylindrical rod element 126 and cylinder 101. The clamp 124 causes the inner surface of the swaged end portion 122 to firmly grip the rod element 126.

Having described our invention, we claim:

1. Apparatus for use in a power steering system to effect actuation of a steering linkage, said apparatus comprising a cylinder having a wall at least partially defining a cylindrical chamber, said cylinder having a rod end and a head end located at opposite ends thereof, said cylinder wall having a main portion of a first internal diameter and a swaged head end portion defining an opening of a second internal diameter which is different than said first internal diameter, a piston slidably disposed within said chamber, a piston rod connected with said piston and extending from the rod end of said cylinder, a ball and socket assembly connected directly to said swaged head end portion of said cylinder wall, said socket assembly including a ball, an outwardly projecting ball stud fixedly connected with said ball, a socket wall at least partially defining a recess for receiving said ball, and a socket rod integrally formed with said socket wall and extending transversely to said ball stud, said socket rod extending through said opening defined by said swaged head end portion of said cylinder wall, and means for fixedly and sealingly interconnecting said socket rod and said swaged head end portion of said cylinder wall to prevent relative movement therebetween and fluid leakage therebetween.

2. Apparatus as set forth in claim 1 further including a second socket assembly connected with said piston rod and adapted to be connected with the steering linkage.

3. Apparatus as set forth in claim 1 wherein said second internal diameter is less than said first diameter.

4. Apparatus as set forth in claim 1 wherein said means for fixedly and sealingly interconnecting said socket rod and said swaged end portion of said cylinder wall comprises a weld continuously encircling and engaging said socket rod and said swaged head end portion of said cylinder wall.

5. Apparatus as set forth in claim 1 wherein said piston is movable relative to said cylinder wall between a retracted position and an extended position, said piston being disposed in abutting engagement with said socket rod when said piston is in said retracted position.

* * * * *